Jan. 11, 1966  C. M. EASON ETAL  3,228,501
FRICTION CLUTCH
Filed Aug. 26, 1963                               5 Sheets-Sheet 1

INVENTORS
Clarence M Eason,
John J. Pfeffer,
BY George W. Culbertson
Brown, Jackson, Boettcher & Dienner
ATTYS.

3,228,501
Patented Jan. 11, 1966

3,228,501
FRICTION CLUTCH
Clarence M. Eason and John J. Pfeffer, Waukesha, and George W. Culbertson, Oconomowoc, Wis., assignors to Industrial Clutch Corporation, Waukesha, Wis., a corporation of Wisconsin
Filed Aug. 26, 1963, Ser. No. 304,578
13 Claims. (Cl. 192—69)

The present invention relates generally to friction clutches of the type comprising a set of driving clutch plates and a set of driven clutch disks, which are nested together in closely spaced alternating relation along a common axis.

This type of clutch is usually engaged by exerting an axial thrust against one end of the assembly or nest of clutch plates to compress the driving plates and driven clutch disks together into firm frictional clutching engagement, such axial thrusting being usually performed by a compressed air cylinder or other power source. The clutch is usually released by the action of spring energy which is arranged to exert a separating force on the clutch plates and disks when the compressed air is released from the power cylinder.

Heretofore, in most instances, in the operation of releasing such type of clutch, the accurate restoration of both the driving clutch plates and the driven clutch disks back into their original spaced idling positions with a high degree of exactness, and positively retaining them in such positions, has been thought to be unnecessary or has presented problems which, to the best of our knowledge, have not been solved.

It is the fundamental object of the present invention to provide improved automatically operating mechanism which will separate the driven clutch disks as well as the driving clutch plates or disks in the clutch releasing operation, and which will positively restore or relocate both sets of disks and plates back into their original positions, and which will also positively retain them in such original positions, so that no frictional contact or drag can occur between the driving plates and the driven disks throughout the entire idling operation of the clutch, no matter how long such operation may continue.

Recently, the desire or need for such positively maintained separation between the driving and driven clutch disks during relatively long idling operating periods of the clutch, has become more important in connection with power transmission systems in which a reverse drive, or a change-speed drive, or other like drive, is obtained solely by the selective energization of different clutches, without having to resort to shifting sliding gears into and out of mesh with each other.

This latter type of power transmission mechanism is well exemplified by certain types of marine reversing gear, and/or reducing and reversing gear, in which forward propulsive rotation is transmitted to the propeller by the engagement of a forward drive friction clutch, and in which reverse propulsive rotation is transmitted to the propeller by the engagement of a reverse drive friction clutch, without requiring any gear shifting operation whatever. In such types of marine driving gear, the reverse drive clutch has one set of disks permanently coupled to the engine and the other set of disks permanently coupled to the propeller shaft, with reverse drive gearing interposed in one of these lines of coupling. Because of the interposition of the set of reverse drive gears in such line of coupling connecting with the reverse drive clutch, as long as this reverse drive clutch is not engaged but is merely idling, the two sets of clutch disks therein revolve continuously but in opposite directions. Because of the reverse directions of rotation of the two sets of disks in this idling operation of the reverse drive clutch, it is obvious that the differential rate of rotation between the driving disks and the driven disks is necessarily twice as high as the input speed.

It is well known that in marine usage, such as in a trans-oceanic crossing, the forward drive clutch may remain engaged for days at a time, and during this entire time interval the reverse drive clutch is undergoing idling rotation, but with the driving disks and the driven disks revolving at a differential velocity of approximately twice the normal differential velocity. Hence, these reverse drive marine clutches are frequently subject to more rapid wear than are the forward drive clutches, which wear, for the reasons above stated, does not occur during the relatively short and infrequent periods of engagement of the reverse drive clutch, but occurs during the long persistent periods of idling operation of the reverse drive clutch, when the two sets of disks therein are revolving at relatively high differential rates, and more particularly when the two sets of disks are not positively maintained in completely separated positions, but are permitted to have sloppiness of positioning so that rubbing contact, even light in pressure, can occur therebetween either continuously or at random intervals.

Moreover, in a marine situation, the reverse drive clutch is generally set at a downwardly sloping angle to match up with the center line of the propeller shaft. This out-of-level condition definitely tends to cause one or the other sets of disks or plates to drift or slide down their inclined mounting into contact with the other set.

Still further, the fore and aft pitch of the ship, particularly in heavy seas, will tend to slide any shiftable clutch plates or disks, particularly those running idle in a disengaged clutch, unless they are very effectively held by reliable positioning mechanism.

Finally, a marine transmission is subject to heavy vibration, frequently intensified by reverberations from the hull of the ship, which may tend to slide any idling shiftable clutch elements.

In this regard, it is a further object of the invention to provide an improved reversing and/or reducing gear system, either of the above described marine type or of other types comparable thereto, provided with our improved construction of clutch for the purpose of avoiding the difficulties above described.

Other objects, features, and advantages of the invention will be apparent from the following detailed description of certain preferred embodiments of the invention. In the accompanying drawings illustrating such embodiments:

FIGURES 7 and 8 are detail cross-sectional views taken on the planes of the lines 7—7 and 8—8 respectively of FIGURE 5;

Figure 1:
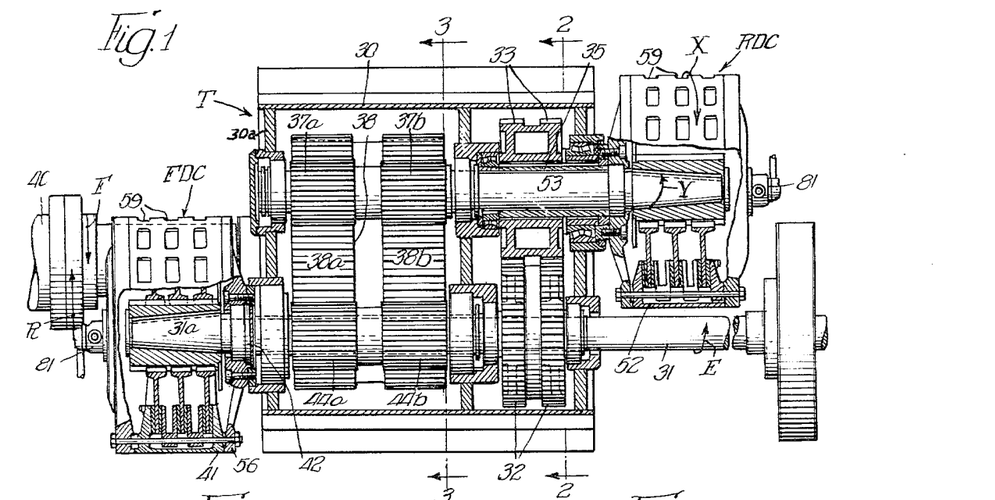
FIGURE 1 is an upper or top view of a marine transmission system corresponding substantially to a view taken on the plane of the horizontal line 1—1 of FIGURE 2.
Figure 2:
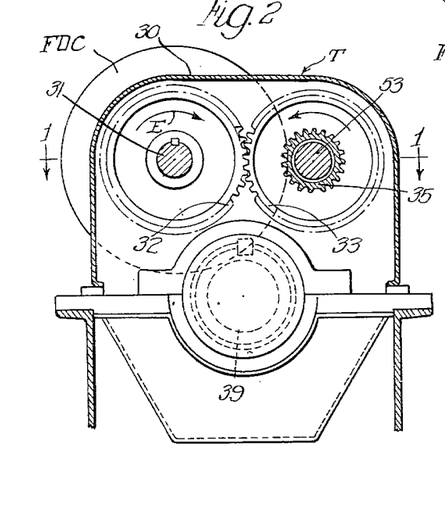
FIGURE 2 is a transverse sectional view taken approximately on the plane of the line 2—2 of FIGURE 1.
Figure 3:
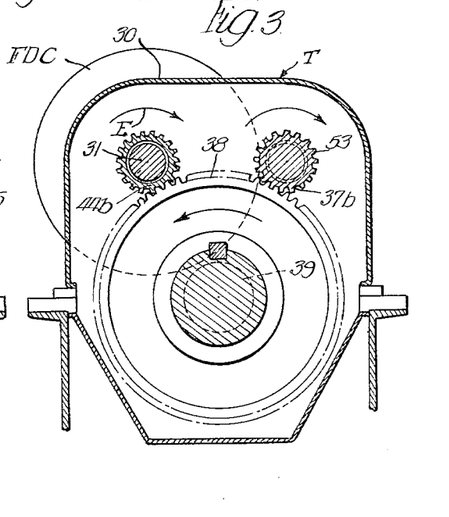
FIGURE 3 is a similar sectional view taken on the plane of the line 3—3 of FIGURE 1.

In FIGURES 1–3 we have schematically illustrated a typical marine reverse gear, designated T in its entirety, which embodies as a unique feature thereof the improved construction of reverse drive clutch hereinafter described in detail. This reverse drive clutch is designated RDC in the drawings. The engine power enters one end of the transmission housing 30 through a power input shaft 31 which has direct keyed connection inside the housing with a double helical or herringbone cut reverse drive transfer gear 32. The conventional direction of rotation of the engine shaft 31 is indicated by the directional arrow E. The gear 32 meshes with a like form of reverse gear 33 which is keyed or splined to a sleeve 35 which extends forwardly out of the housing 30 for bolted attachment to a flange 52 that constitutes the driving element for driving the outer sub-assembly of friction clutch elements of our improved reverse drive clutch RDC. Mounted axially within the sleeve 35 and rotatable independently thereof is a central shaft 53 which also extends forwardly out of the transmission housing 30 to constitute the central driven element that is driven by the inner sub-assembly of friction clutch elements of our improved clutch RDC. It will be seen from the description thus far that when the reverse clutch RDC is released the reverse gear 33 and sleeve 35 merely idle on the axial spindle 53, but that when the clutch is engaged the spindle 53 is compelled to rotate concurrently with the reverse gear 33.

This shaft 53 extends rearwardly beyond the sleeve 35 and gear 33, and has integral oppositely inclined herringbone cut teeth 37a–37b which form a reverse pinion that is in continuous mesh with companion rings of herringbone teeth 38a–38b on a large bull gear 38. This bull gear is secured fast to a shaft 39 which extends out of the rear end wall 30a of the transmission housing 30 and is connected to the propeller shaft 40 by a suitable coupling. Referring again to the engine shaft 31, the rearward end 31a thereof continues out through the rear end wall 30a and has mounted thereon the forward drive clutch FDC which, when engaged, transmits the forward propulsive drive to the bull gear 38 and shaft 39. This rear end portion 31a of the engine drive shaft has connected thereto the inner friction clutch elements, which, in the case of this forward drive clutch FDC, are the driving elements of the clutch.

The outer friction clutch elements, which are here the driven elements of the clutch, have connection with an outer annulus or clutch ring 41 which has bolted attachment to flange 56 which is in turn bolted to sleeve 42 that extends back into the transmission housing, enveloping the shaft 31, 31a. Here, the sleeve 42 has integral forward drive herringbone cut gear teeth 44a–44b which are in continuous mesh with the herringbone teeth 38a–38b on the large bull gear 38. Each of the two clutches is provided with an individual compressed air power cylinder for effecting their selective operation.

It will be seen from the foregoing, that without any shifting or sliding of gears into or out of mesh, whenever the forward drive clutch FDC is engaged, the propeller shaft 40 will be rotated in the direction of the arrow F for forward propulsion, and that whenever this clutch is released and the reverse drive clutch RDC is engaged, the propeller shaft 40 will be rotated in the reverse direction R for reverse or sternward propulsion.

In this type of continuous mesh gear transmission, the outer annulus 52 and the outer sub-assembly of driving clutch elements of the reverse drive clutch RDC always rotate continuously in the same constant direction (indicated by the arrow X) at engine speed, throughout the entire time that either the forward drive clutch FDC or the reverse drive clutch RDC is engaged. However, it should also be noted that so long as the forward drive clutch FDC is engaged, the central spindle 53 and inner clutch elements are being caused to rotate in the opposite direction (indicated by arrow Y), also at engine speed. This is brought about by the drive transmitted from shaft 31 through clutch FDC and forward drive pinions 44a–44b to the bull gear 38, and thence through the reverse drive pinion 37a–37b, formed integral with the shaft 53. Accordingly, it will be seen there will be opposite or differential directions of rotation of the outer and inner sets of clutch elements in the reverse drive clutch RDC, at differential velocities twice that of the velocity of conventional running rotation, throughout the entire time that the forward drive clutch FDC is transmitting forward propulsion. In the case of a vessel, in trans-oceanic travel, this forward propulsion can continue uninterruptedly for days or possibly weeks at a time. Throughout this entire time, the outer and inner sets of clutch elements of the reverse drive clutch RDC are continuously revolving in opposite directions—at differential velocities which are twice the normal running velocity which ordinarily prevails where one set of clutch elements is revolving and the other set is standing stationary. That is to say, assuming an engine speed of 1000 r.p.m., in a transmission of approximately the ratios shown, then in the idling condition of the reverse drive clutch RDC the outer set of clutch elements and the inner set of clutch elements are rotating in opposite directions at a relative velocity of 2000 r.p.m., throughout the entire time that the forward drive clutch FDC remains engaged. Still further, as previously remarked, the entire transmission system T including reverse drive clutch RDC slopes downhill at the sloping angle of the propeller shaft; and the entire installation is subjected to severe vibrations, reverberated by the hull of the ship. It is all of these conditions that make it so important to accurately locate and maintain the idling or out-of engagement shifted positions of the inner and outer sets of friction clutch elements. The forward drive clutch FDC and the reverse drive clutch RDC are both of the same construction, but it is the reverse drive clutch RDC that bears the brunt of the wear because of the above conditions.

Figure 4:
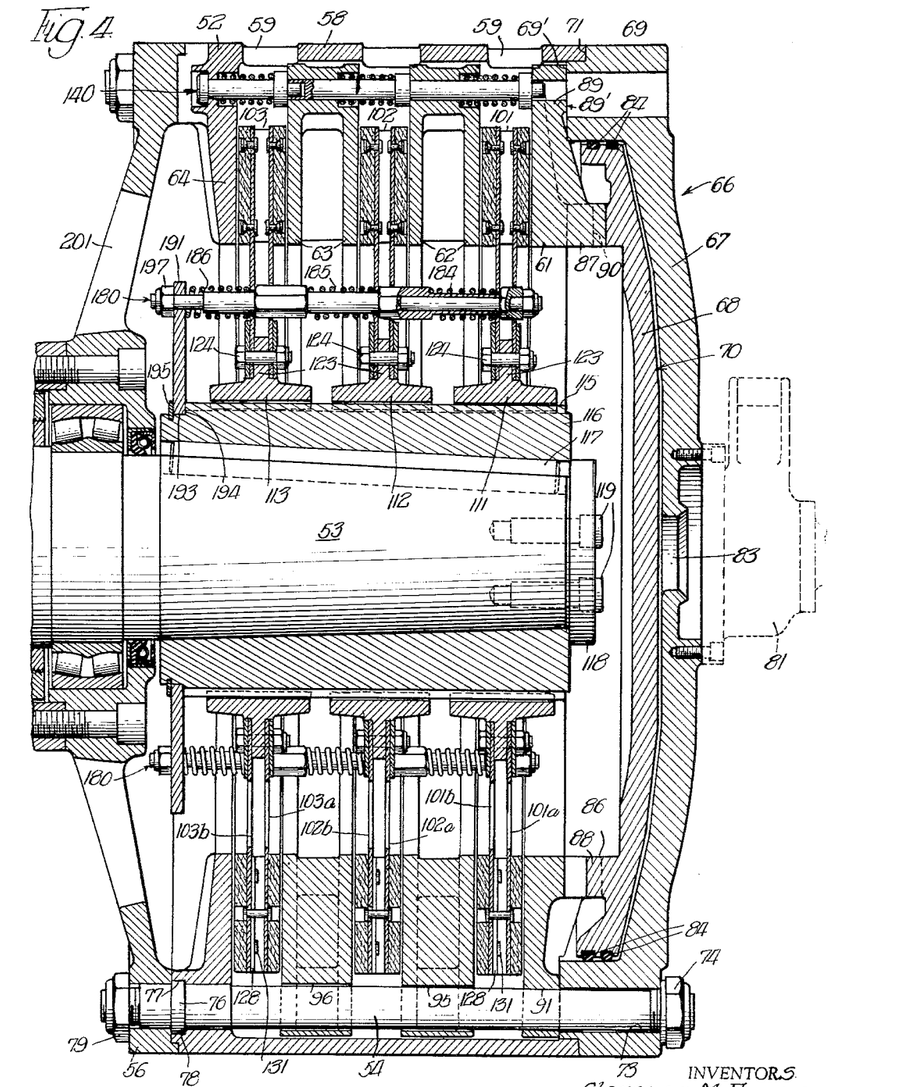
FIGURE 4 is a longitudinal or axial sectional view illustrating on a larger scale the reverse drive clutch of the above transmission system, the clutch being shown in its released or disengaged position.
Figures 5, 6:
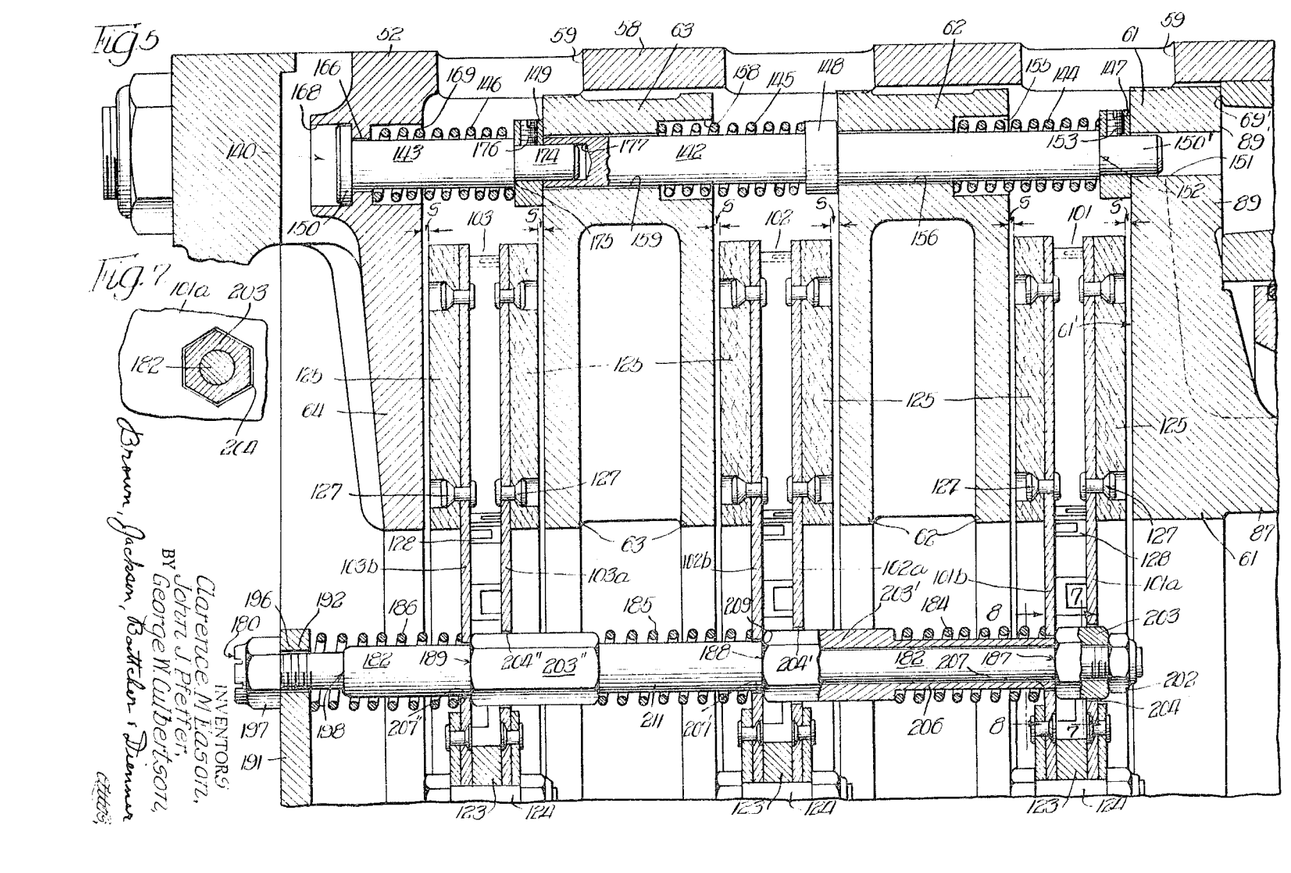
FIGURE 5 illustrates a fragmentary portion of FIGURE 4 on a still larger scale, this view also showing the clutch in its released position.
FIGURE 6 is substantially a duplicate of FIGURE 5, but illustrates the clutch in its engaged or driving position.

Referring now to the detailed construction of the clutch RDC, as being exemplary of both clutches, it will be seen from FIGURES 4, 5 and 6 that this clutch comprises a rotatable outer annulus or clutch ring 52 and an inner independently rotatable shaft 53, both concentrically mounted for rotation about a common axis. The annulus or clutch ring 52 is the driving element, and the shaft 53 is the driven element for the reverse clutch RDC, but this relation is opposite for the forward clutch FDC. The clutch ring 52 is secured by the inner ends of through studs 54 (FIG. 4) to a drive flange 56 located at the end of the transmission housing 30 and having connection with sleeve 35 within the transmission housing, upon which reverse gear 33 is mounted. The inner or left hand end of the shaft 53 extends into the transmission housing, where the integral reverse pinions 37a–37b are located. In the case of the forward drive clutch FDC, the flange 42 is splined to the quill on which the herringbone teeth 44a–44b are formed.

The annulus 52 is formed with an outwardly projecting annular drum portion 58 having spaced apertures 59 therein (FIG. 4) for cooling and access purposes. Formed at the inner portion of this annulus or drum is a radially extending, non-shiftable outer driving clutch plate 64. The outer edge of the drum portion 58 mounts a compressed air power unit 66 comprising an outer cylinder 67 within which slides a piston 68, both of which rotate constantly with the outer driving annulus 52. The cylinder 67 is formed with an annular outer rim 69 which has its inner edge turned down at 71 to form a piloted mounting fit within the outer end of the drum ring 58. Referring to FIG. 4, the aforementioned through bolts 54 pass through holes 73 in the outer rim 69 and receive nuts 74 on their outer or front ends, there being several of these through studs 54 equally spaced around the assembly. The inner ends of the through bolts are formed with flanges or stop collars 76 receivable within recesses 77 formed in the inner face of the annulus 52, and the inner extremities of the through studs receive nuts 79 which serve to clamp together the drive flange 56, annulus 52 and compressed air cylinder head 67. Keying pins 78 interposed between the stop collars 76 and recesses 77 prevent rotation of the through studs 54 when the nuts 74 or 79 are tightened. The cylinder space 70 between the cylinder head 67 and piston 68 is adapted to receive compressed air through any conventional form of rotary seal 81 which establishes communication between the stationary compressed air supply pipe and the revolving central port 83 leading to the cylinder area. The peripheral surface of the piston 68 has any suitable arrangement of piston rings, such as O-rings 84 composed of neoprene or the like. The inner face of the piston 68 is provided with an inwardly projecting abutment shoulder 86 which is adapted to transmit axial thrust in an inward direction to a similar abutment shoulder 87 projecting outwardly from an outer radially extending shiftable clutch plate 61. The abutment shoulder 86 is formed with milled lugs 88 which fit into notches 90 milled out in the other abutment shoulder 87, such arrangement preventing relative rotation of the piston within the cylinder, which could otherwise result in rapid wear of the O-rings 84.

Referring particularly to FIG. 4, showing the relative positions when the clutch is disengaged, this outer shiftable clutch plate 61 has an outer peripheral flange 89 having a radial front abutment face 89' that is normally held pressed against the radial inner abutment 69' of the cylinder head flange 69. This outer flange 89 of the axially shiftable clutch plate 61 is also provided with guide apertures 91 having free sliding guided engagement over the through studs 54, whereby the clutch plate 61 is compelled to rotate with the through studs to function as a driving clutch plate in the clutch assembly. Interposed between this axially shiftable outer driving clutch plate 61 and the inner axially fixed driving clutch plate 64 are one or more intermediate driving clutch plates, two preferably being shown, designated 62 and 63. These intermediate clutch plates 62 and 63 also have angularly spaced guide holes 95 and 96 adapted to have free sliding engagement over the through studs 54, whereby these intermediate driving clutch plates can be pushed axially inwardly with the inward shifting movement of the outermost or front driving clutch plate 61.

Referring now to the driven disk elements of the clutch assembly, FIGS. 4–6 show three such driven clutch disk elements or assemblies 101, 102, 103, which are interspersed between the driving clutch plates as follows: the assembly 101 is disposed between the first or outermost shiftable driving clutch plate 61 and the second shiftable driving clutch plate 62; the second driven disk assembly 102 is disposed between the second shiftable driving clutch plate 62 and the third shiftable driving clutch plate 63; and the third driven disk assembly 103 is disposed between the third shiftable clutch plate 63 and the fourth or innermost driving clutch plate 64, which is non-shiftable. All three of these driven assemblies or disks 101, 102 and 103 are secured to separate axially aligned hubs 111, 112, and 113 which are internally splined for free axial sliding movement over external splines 115 on a hub 116 which is keyed at 117 to the tapered end of the shaft 53, and is held thereon by an end cap 118 which is pulled up against the end face of the hub by cap screws 119 threaded into the shaft.

Each of the three driven disk assemblies comprises two laterally spaced sheet steel disks 101a–101b, 102a–102b, etc., which have their inner peripheries secured in spaced relation on the opposite sides of flanges 123 projecting outwardly from the slidable bosses 111–113, this attachment preferably being effected by angularly spaced bolts 124. Secured to the outer faces of each cooperating pair of disks are rings or segments 125 composed of any suitable friction facing lining material, the latter being secured to the outer faces of the metallic disks by the rivets 127, or by bonding, or both. Secured to the inner faces of each cooperating pair of disks 101a–101b, etc., are channel-shaped spacers or separators 128, which are secured by rivets 131 in oblique angular positions across the faces of the disks, whereby to stimulate air circulation between the disks for cooling purposes during their rotary movement. This general construction and arrangement preferably conforms substantially to the prior Eason Patent 2,674,356. It will be understood that the above-described details of clutch construction merely show an exemplary or preferred embodiment for illustrating one adaptation of our invention, but that the invention is not limited to clutches embodying these above-described details.

Referring now to the improved clutch separating apparatus of our invention, we will first describe the separating and locating apparatus which acts on the outer subassembly of shiftable clutch plates 61, 62 and 63 for accurately restoring these shiftable clutch plates back into their predetermined original or normal positions when the clutch is released. This separating and locating apparatus is designated 140 in its entirety, and comprises a plurality of angularly spaced aligned assemblies each one of which is made up of a longitudinally extending locator rod 142, a push stud extension 143, three compression springs 144, 145 and 146, and three stop collars or flanges 147, 148 and 149. These aligned assemblies are located at angularly spaced points around the clutch assembly and are interspersed between the through studs 54, and may be located at approximately the same radial distance from the clutch axis. The locator rods 142 and push stud extensions 143 both having free sliding movement in guide holes extending through the outer peripheral portions of the outer clutch plates 62, 63 and 64. The outer or right hand end (FIG. 5) of the locator rod or stud 142 has a reduced outer extension 150' which has a slip fit in a hole 151 drilled in the flange 89 of the outer or front clutch plate 61. This reduced outer extension 150' establishes an inwardly disposed shoulder 152, against which abuts the first stop collar 147 which is anchored to the reduced end 150' of the rod 142 by a set screw 153. The outer surface of this first stop collar 147 always bears against the inner face 61' of the front or outer shiftable clutch plate 61. The first compression spring 144 abuts the back side of the first stop collar 147. The other end of this first compression spring 144 seats in a counterbore 155 formed in the outer face of the second driving clutch plate 62.

The locator rod or stud 142 continues inwardly through a guide hole 156 in this second shiftable driving clutch plate 62, and on the back side of this second shiftable clutch plate 62 the locator rod 142 carries a stop flange 148. The second compression spring 145 abuts the back side of this flange 148. The other end of this second compression spring 145 seats in a counterbore 158 formed in the outer face of the third shiftable driving clutch element 63. The locator rod 152 thence continues inwardly through a guide aperture 159 extending through the third shiftable driving clutch elemnt 63. In the normal disengaged condition of the clutch (FIG. 5) the inner or left hand extremity of the locator rod 142 terminates substantially flush with the inner or left hand face of the third shiftable driving clutch plate 63.

Referring now to the push stud extension 143, this comprises a rod or pin which extends in alignment with the rod 142 and has endwise slidable mounting in a guide opening 166 formed in the stationary inner driving clutch plate 64, which guide takes the form of an inwardly extending flange that separates back and front aligned counterbores 168 and 169 in the inner non-shiftable driving clutch plate 64. The inner extremity of the extension stud 143 is provided with an enlarged head 150 that slides in the inner or back counterbore 168. The front end of this extension stud 143 has a reduced projecting protion 174 which defines a stop shoulder 175, and mounted with a press fit on this extension portion 174 in abutment against the stop shoulder 175 is the third stop collar 149 which is further held in place by a set screw 176. The reduced extension 174 continues beyond the stop collar 149 and has a snug guiding fit within a drilled hole 177 in the end of the push rod 142. The third compression spring 146 is mounted on the extension stud 143 between the counterbore 169 and the inner side of the third stop collar 149. The length of the confining space for this third spring 146 is shorter than that for either of the other springs 144 or 145, and hence this spring 146 exerts a few more pounds of axial present thrusting pressure than the other springs. Such exerts a normal or continuous thrusting force against the stop collar 149 and thus normally tends to hold the push stud extension 143 pushed or thrust outwardly toward the right, into the normal position shown in FIG. 5. In this position, the outer or end face of the third stop collar 149 has pushing abutment against the adjacent inner face of the third shiftable clutch plate 63.

In the normal disengaged condition of the clutch, the locator rod 142 has been thrust toward the right into the position shown in FIG. 5 by the pressure of the third spring 146 acting through the stop collar 149 for bringing axial pressure to bear against the left hand end of the locator rod 142. This acts thrust-wise through the locator rod 142 to cause the first stop collar 147 to thrust the outer or first clutch plate 61 outwardly until the end face 89' thereof abuts against the inner end face 69' of the air cylinder. Such spring shifted location of the locator rod 142 also brings the second stop collar 148 into position for predetermining the location of the second shiftable clutch plate 62 in the disengaged condition of the clutch; and it furthermore causes the third stop collar 149 to assume the proper position for predetermining the location of the third shiftable clutch plate 63 in this disengaged condition of the clutch. Co-operating with the second and third stop shoulders 148 and 149 are the first and second compression spring 144 and 145. The first compression spring 144 operates to hold the second shiftable clutch plate 62 thrust inwardly into firm abutment against the second stop collar 148, and the second compression spring 145 serves to maintain the third clutch plate 63 thrust inwardly into firm abutment against the third stop collar 149. Thus, it will be manifest that the improved outer clutch plate separating and positioning mechanism 140 serves to separate and to accurately position each of the exially shiftable outer driving clutch plates (three being shown, designated 61, 62 and 63) with respect to the non-shiftable driving clutch plate 64, whereby all four of these driving clutch plates will be equi-distantly spaced and accurately maintained during the entire idling rotation of the driving clutch plates.

In the clutch released position shown in FIGURE 5, it will be noted that each of the four outer driving clutch plates 61, 62, 63 and 64 is separated from the three inner driven clutch disks 101, 102 and 103 by substantially a constant or identical spacing distance desigated $s$, which in the average marine clutch will generally be in the neighborhood of $\frac{1}{16}$ inch. It will be noted that when the clutch stands in released condition there are six of these open clearance spaces $s$ which require to be taken up or closed in order to effffect the complete engagement of the clutch.

In the operation of engaging the clutch, the energization of the compressed air piston 68 starts transmitting inward shifting movement to the outermost or first clutch plate 61. The locator rod 142 immediately moves inwardly concurrently with inward shifting movement of the first clutch plate 61, by reason of the abutment of the latter against the first stop collar 147. Accordingly, the second and third stop collars 148 and 149 will also start moving inwardly concurrently with the stop collar 147 and locator rod 142. The concurrent or simultaneous inward shifting movement of the second and third stop collars 148 and 149, along with the first stop collar 147, insures that the two intermediate shiftable clutch plates 62 and 63 will move into clutching engagement with the respective inner driven clutch disks 102 and 103 simultaneously with the clutching engagement between the outer driving plate 61 and the inner driven disk 101. Thus, clutching engagement between the shiftable outer clutch plates and the shiftable inner clutch disks occurs simultaneously instead of progressively, resulting in more even wear.

Referring to FIGURE 6, when the clutch is completely engaged the first shiftable clutch plate 61 will necessarily have shifted a distance toward the left equal to $6s$ for closing up the aforesaid six spaces; and each stop collar 147, 148, 149 and end head 150 will also have shifted toward the left a corresponding distance. With regard to the distance of each stop collar from its respective clutch plate, it will be noted that as a result of the shift transmitted to the clutch plates through the engagement of the friction clutch surfaces, the second stop collar 148 will have an advanced spacing of $2s$ from its associated second clutch plate 62, and the third stop collar 149 will have an advanced spacing of $4s$ from its associated third clutch plate 63. It will also be seen that the first driven clutch disk 101 will have been shifted a distance of $5s$, the second clutch disk 102 will have been shifted a distance of $3s$, and the third clutch disk 103 will have been shifted a distance of $1s$, all as shown in FIG. 6.

It should be pointed out here that the above construction and arrangement of the outer separating apparatus 140, which operates upon the outer clutch plates, makes it possible to assemble or dis-assemble the major parts of the clutch without having to release all of the spring assemblies. For instance, when once assembled in the counterbores 168, 169 of the drive ring flange or clutch plate 64, the push stud extension sub-assembly consisting of extension 143, spring 146 and stop collar 149, can remain in place permanently. This is also true of the locator stud sub-assembly consisting of stud or rod 142, spring 144 and stop collar 147 with set screw 153, which sub-assembly can be left permanently in place after it has been assembled in the guide hole 156 of shiftable clutch plate 62. Such clutch plate can be assembled into or removed from the drum portion 58 of annulus 52 with all of these sub-assemblies in place. The only loose part in each sub-assembly will be the spring 145 which will stay on the inner end of locator rod 142 when the clutch plate 62 is being assembled into the drum or ring portion 58; and which spring 145 will either remain in the counterbore 158 of clutch plate 63, or will remain on the locator stud or rod 142, when removing the clutch plate 62 from the clutch. There are preferably twelve of these outer locator assemblies 140 spaced around the clutch.

Referring now to the separating and locating apparatus which operates upon the inner or inside set of driven clutch disks 101, 102 and 103, such apparatus is designated 180 in its entirety, and comprises a plurality of angularly spaced aligned assemblies, each one of which is made up of a longitudinally extending locator rod 182, three compression springs 184, 185 and 186, and three locating shoulders or stops 187, 188 and 189, all cooperating to establish fixed locations for the normal idling positions of the inner clutch disks 101–103 There are preferably six of these locator assemblies angularly spaced around the clutch, and the inner ends of each pass through holes 192 in a fixed locator disk 191 which is mounted on the inner end of the splined mounting hub 116. This disk is slipped over a cylindrical inner portion 193 of the hub, up against a shoulder 194, where it is held in place by a snap ring 195.

Each locator rod 182 has a reduced threaded inner extension 196 that passes with a free slip fit through the aperture 192 and receives an adjusting nut 197 of the self-locking type which is screwed over its inner end. Access to the nut 197 for adjusting purposes is afforded through an opening 201 provided in the drive flange 56.

Figures 6, 8:
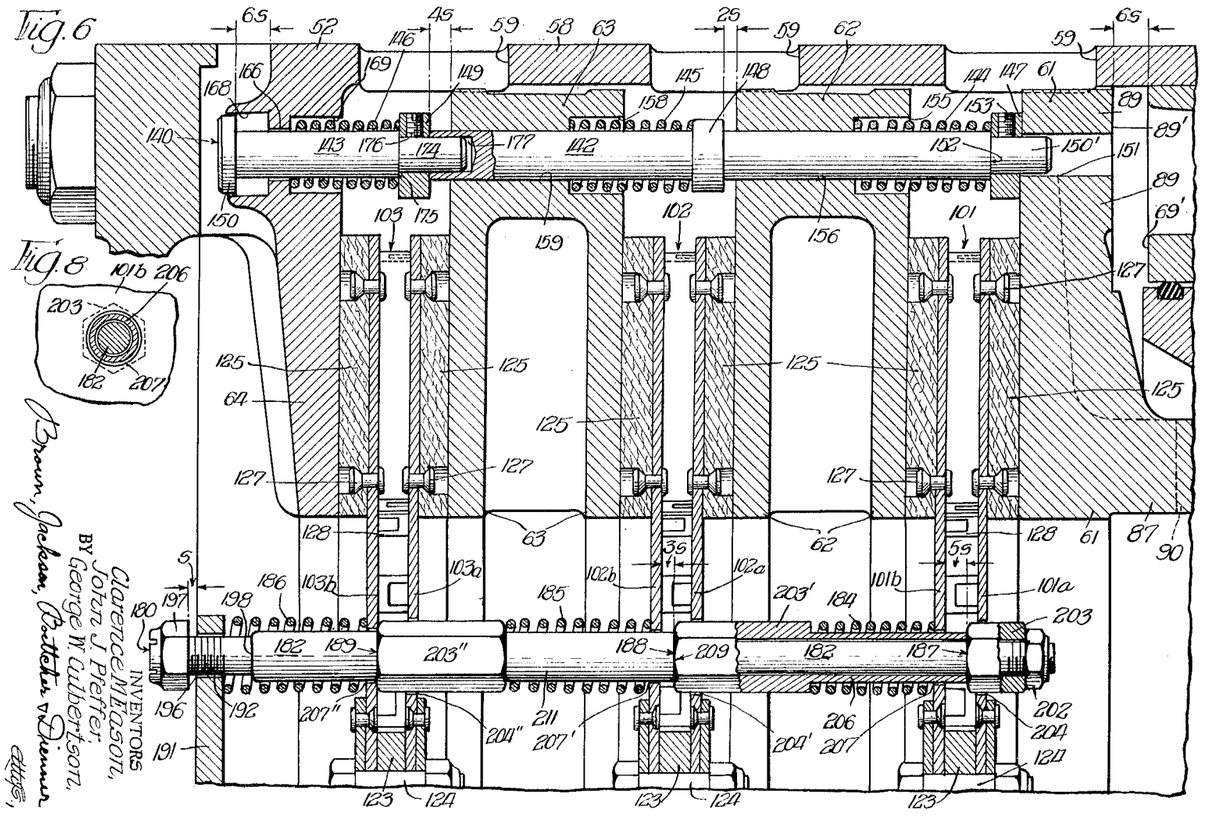

Each locator rod 182 extends through aligned apertures in the series of inner clutch disks 101, 102 and 103, and has its outer end threaded for receiving a nut 202 beyond the outer face of the first clutch disk 101. The nut 202 screws inwardly against a locator collar 203, the inner face of which defines the first stop shoulder 187 for predetermining the normal idling position of the first inner or inside clutch disk 101. The locator collar 203 is of polygonal cross-section or contour and has a free sliding fit within a corresponding polygonal hole 204 formed in the outermost plate 101a of the first clutch disk assembly 101, as shown in FIGURE 7. Such polygonal hole 204 permits inward shifting movement of the disk plate 101a along the locator collar 203 in the operation of engaging the clutch, but prevents rotation of the collar 203 within the hole 204 in this outer disk plate 101a. Such polygonal collar 203 and hole 204 may be of square, hexagonal, key-and-slot, or any other polygonal outline, but are preferably of hexagonal form because such permits the use of hexagonal bar stock for forming the collars 203. The stop shoulder 187 defined by the inner end of the collar 203 is adapted to be abutted by the inner face of the other or inner clutch disk 101b for predetermining the normal disengaged or idling position of the inner clutch disk 101. The inner end or stop shoulder 187 of the collar 203 also abuts the end of a circular sleeve 206 which surrounds the locator rod 182, and which has a free sliding fit within a hole 207 also of circular form which is punched out in the inner disk plate 101b in alignment with the hexagonal hole 204 in the outer disk plate 101a. As shown best in FIGURE 8, this circular hole 207 has a smaller effective area than the companion hexagonal hole 204 and the hexagonal stop shoulder 187, so that in all shifting movement of the clutch element 101 toward the right this circular hole 207 will always strike the hexagonal stop shoulder 187 at the end of the hexagonal locator collar 203, which thereby predetermines the normal idling or clutch released position of the first inner clutch disk 101. In like manner, the second and third clutch disks 102 and 103 are also provided with such pairs of companion hexagonal holes 204', 204'' and circular holes 207', 207'', for performing the same locating functions with respect to these clutch disks, as will be presently described. The inner end portion of the sleeve 206 is formed with a collar 203' of hexagonal bar stock which also passes with a slip fit through a hexagonal hole 204' in the front or outer disk plate 102a of the second driven disk assembly 102, such second hexagonal collar 203' and second hexagonal hole 204' preferably being of the same sizes as the first hexagonal collar 203 and first hexagonal opening 204. The inner end of the hexagonal collar 203' constitutes the second stop or locating shoulder 188 for predetermining the normal disengaged position of the second inner clutch disk 102. This second locating shoulder 188 also abuts against a shoulder 209 defined at the outer end of an enlarged shank or boss 211 formed integral with the locator rod 182. The companion circular opening 207' in the other or inner disk plate 102b is adapted to strike this second hexagonal stop shoulder 188 in determining the idling position of this second clutch disk 102. Surrounding the outer portion of the sleeve 206 between the second hexagonal collar 203' and the disk plate 101b is the first compression spring 184 which normally tends to force the disk plate 101b up against the first stop shoulder 187. The inner portion of the enlarged shank or boss 211 is formed with a third collar 203'' of hexagonal bar stock which has non-rotative mounting within a third hexagonal hole 204'' formed in the disk plate 103a of the third driven disk assembly 103, the hexagonal hole 204'' having a slip fit over the hexagonal collar 203''. The second compression spring 185 surrounds the enlarged shank 211 between the inner plate 102b of the second clutch disk 102 and the third hexagonal collar 203'', this spring normally tending to force the disk plate 102b up agaisnt the second stop shoulder 188. The inner end of the third hexagonal collar 203'' defines the third stop shoulder 189 against which the circular opening 207'' in the adjacent face of the disk plate 103b is adapted to engage for determining the normal position of the third clutch disk 103. From the third stop shoulder 189, the locator rod 182 continues inwardly through the third circular opening 207'' to the reduced portion 196. As previously descirbed, this reduced portion 196 extends freely through hole 192 in the locator or index disk 191, and is threaded for receiving the adjusting nut 197 adapted to have adjustable stop abutment against the inner side of such disk 191.

It will be understood that the distance from the first stop shoulder 187 to the second stop shoulder 188 is identical with the distance from the second stop shoulder 188 to the third stop shoulder 189. It should also be understood that this distance is identical with the span from the center line between driving clutch elements 61-62 to the center line between clutch elements 62-63, and is further identical with the span from the center line between clutch elements 62-63 to the center line between clutch elements 63-64.

The feature of the hexagonal exterior formations 203, 203' and 203'', and their cooperating closely fitting hexagonal apertures 204, 204' and 204'' in the disk plates 101a, 102a and 103a, serves to positively hold each locator rod 182 against rotation during the manual rotation of the adjusting nut 197. Such adjustment of the nut 197 effects a simultaneous shifting adjustment of all three stop shoulders 187, 188 and 189 either inwardly or outwardly, for the purpose of positively locating the driven clutch disks 101, 102 and 103 at predetermined longitudinally spaced points in the disengaged idling operation of the clutch.

It will be seen from the foregoing that the series of outer locator rods 142 with their outer stop shoulders 147-149 and outer compression springs 144-146 function to separate and to accurately locate the shiftable outer clutch elements 61, 62 and 63 whenever the clutch is released. It will also be seen that the series of inner locator rods 182 with their inner stop shoulders 187-189 and inner compression springs 184-186 also function to separate and to accurately locate the shiftable inner clutch elements 101, 102 and 103 whenever the clutch is released. It should be noted that by reason of having the locator adjusting nut 197 at the inside end of each inner locator rod 182, there is nothing to interfere with the location of the compressed air cylinder 70 on the outside or front end of the clutch assembly.

The location of the adjusting nut 197 at the inner end of each inner locator rod 182 may make this adjusting nut slightly difficult of access. Accordingly, the hexagonal profiles of the stop shoulders or collars and the hexagonal outlines of the openings 204-204'' are important for positively preventing the locator rod 182 from rotating with the adjusting nut 197 whenever the latter is being manually rotated in the performance of an adjusting operation for adjusting the normal idling positions of the three inner clutch disks 101, 102 and 103. Rotation of each of these adjusting nuts 197 in an inward direction along the threaded extension 196 pulls the associated locator rod 182 and the three inner clutch disks 101-103 toward the left, and, conversely, rotation of these nuts in the other direction results in the associated compression spring 186 shifting the locator rod and the three clutch disks in the opposite direction or toward the right. Thus, by virtue of a spring urged shifting of the locator rod 182 in one direction, the opposite directions of rotation of the adjusting nut 197 is made effective to shift the locator rod and clutch disks either toward the right or toward the left, without requiring the intervention of any other nut, etc. As these shifting adjustments of the inner clutch disks 101–103 are made, they can be visually checked by looking inwardly through the ventilating openings 59 to determine the accuracy of positioning relatively to the outer clutch plates 61–64. The accurate positioning of any one of the inner clutch disks 101–103 relatively to the adjacent outer clutch plates positively establishes that the inner clutch disks will be accurately positioned with respect to their adjacent outer clutch plates because all three inner clutch disks 101–103 move together in such an adjusting operation.

As previously remarked, there are preferably twelve of the outer locator assemblies 140 acting on the outer clutch plates 61–64 and piston 68, as compared with six inner locator assemblies 180 acting on the inner clutch disks 101–103, the greater number of the outer locator assemblies being desirable to provide the additional spring energy required to shift the heavier outer clutch plates 61–63 and to shift the piston 68 back into its normal position within the cylinder 70. It will be understood of course that this reference to the number and proportions of the outer and inner locator assemblies is merely exemplary and is not limitative of the invention.

Figures 9, 10, 11:
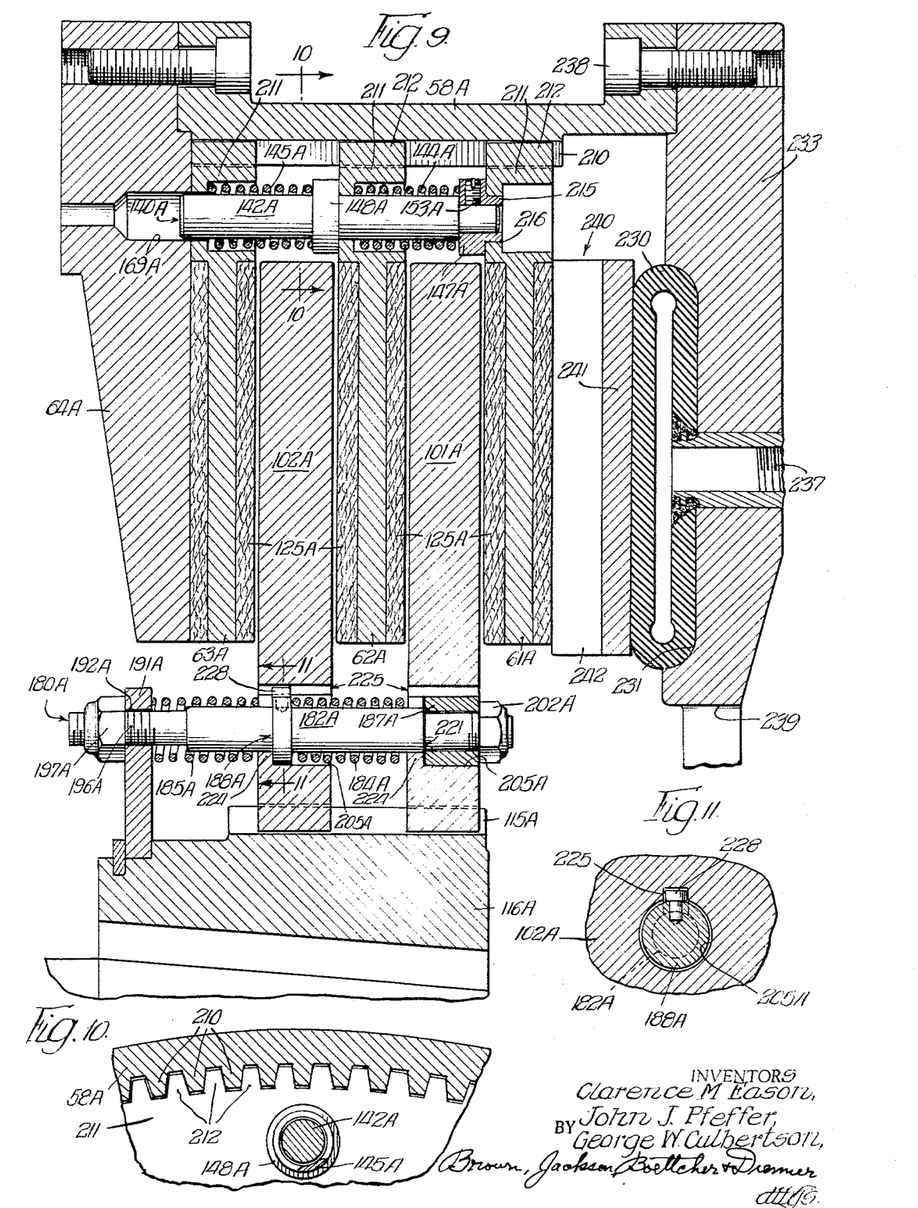
FIGURE 9 is a fragmentary axial sectional view, similar to FIGURES 5 and 6, showing a modified construction.
FIGURE 10 is a fragmentary transverse sectional view taken on the plane of the line 10—10 of FIGURE 9.
FIGURE 11 is a detail sectional view taken on the plane of the line 11—11 of FIGURE 9.

In FIGURES 9–11 we have illustrated a modified construction embodying several differences from the previously described construction. One of these differences resides in the gear tooth drive transmitted from the outer annulus or drum 58A to the driving clutch plates 61A, 62A, 63A, etc. As shown in FIGURE 10, the annulus 58A is formed with a continuous series of internal gear teeth 210, which extend throughout that length of the annulus that is spanned by the driving clutch plates 61A, 62A, etc. Each of these driving clutch plates has an outer peripheral rim 211 around which are formed external spur gear teeth 212 which mesh with the internal spur gear 210. The mesh fit between the teeth permits free sliding movement of the clutch plates relatively to the outer annulus 58A. Extending inwardly from the center of each peripheral rim 211 is the clutch plate proper 61A, 62A, etc. To the opposite sides of each clutch plate are secured flat circular rings of clutch facing material 125A, fastened by rivets or bonding, or both. The above described driving clutch plates are restored to their original predetermined separated positions by the separating and locating apparatus designated 140A, which is substantially a counterpart of the previously described apparatus designated 140. This apparatus 140A comprises a longitudinally extending locator rod 142A, two compression springs 144A and 145A, and two stop collars or flanges 147A and 148A. The left hand end of the locator rod 142 has a free sliding fit in a counterbore 169A in the driving clutch plate 64A; and the right hand end of such locator rod is secured by a set screw 153A in stop collar 147A. In this instance, the stop collar 147A may be provided with a reduced outer neck 215 mounted in a counterbore 216 in the external rim 211 of clutch plate 61A. The mode of operation of this separating and locating apparatus 140A is substantially the same as the previously described separating and locating apparatus 140.

The inner driven clutch elements which are mounted on the inner driven hub 116A are shown in this embodiment as being in the form of solid clutch plates 101A and 102A. The central holes in these driven clutch plates are internally splined for free sliding movement over external splines 115A on the driven hub 116A which has keyed mounting on the driven shaft. These driven clutch plates 101A and 102A are accurately restored automatically to their predetermined original positions, upon release of the clutch, by separating and locating apparatus designated 180A which is quite similar to the previously described separating and locating apparatus 180. The apparatus 180A, of which there are several circularly arranged around the clutch, comprises the longitudinally extending locator rod 182A, the two compression springs 184A and 185A, and the two locating shoulders or stops 187A and 188A, all cooperating to establish fixed locations for the normal idling positions of the inner clutch plates 101A and 102A. The inner ends of each of these locator rods 182A have slip mounting in holes 192A provided in the fixed locator or index disk 191A secured to the inner portion of the splined mounting hub 116A, substantially as previously described. The inner stop collar 187A fits over a reduced threaded end of the rod 182A, where it is fixedly held against a shoulder 221 by the nut 202A. Both driven clutch plates are formed with counterbores 205A, each counterbore extending inwardly from the outer side of the clutch plate and terminating at the inwardly projecting stop shoulder 224. The stop collars 187A and 188A seat in these counterbores, being normally in abutment with the adjacent face of the stop flange or shoulder 224. As shown in FIGURE 11, each counterbore 205A is formed internally at one side with a key-way or groove 225 which extends from one side of the clutch plate to the other, also extending through the stop shoulder or flange 224. Screwing into the stop collar 188A is a keying screw 228, the head of which has a close but free sliding fit within the key-way 225 of the clutch plate 102A. This establishes a keying relation which prevents rotation of the locator rod 182A when the adjusting nut 197A is screwed inwardly or outwardly along the threaded inner end 196A of the locator rod. The keying screw 228 may be mounted optionally either in the stop collar 187A or in the stop shoulder 188A. The operation of this modified separating and locating apparatus 180A is substantially the same as that of the previously described locator apparatus 180.

Instead of using a complete air cylinder and air diaphragm spanning the outside diameter of the clutch elements, we have shown in this modified construction the use of an inflatable annulus or doughnut shape of inflatable ring or bag 230 which has its outer surface seating in a circular depression 231 recessed into the inner side wall of the outer head plate 233. Compressed air is supplied to the doughnut ring through one or more inlet and exhaust passages 237, having suitable manifold or rotary union connection with a centrally located compressed air supply union and valve. The head plate 233 is preferably in the form of a ring detachably secured to the annulus 58A by cap screws 238, and preferably has a central axial opening 239 therein.

The inner surface of the expansible doughnut 230 is arranged to exert inward thrusting pressure against a molded composition pressure plate 240. This pressure plate is molded with a solid outer disk portion 241, from the inner side of which integrally project a series of angularly spaced radially extending ribs 242 which have their inner surfaces arranged to transmit inward shifting motion directly to the outer surface of the front driving clutch plate 61A. The radially extending spaces between the ribs 242 induce a centrifugally outward flow of cooling air through this portion of the clutch assembly. The inflation of the doughnut ring 230 shifts the series of clutch elements towards the left for effecting clutch engagement, and upon the deflation of this pneumatic ring the several springs of the locator mechanisms restore the clutch elements back into their disengaged positions, substantially as previously described. Thus, in the disengaged condition of the clutch, the locator mechanisms 140A and 180A function to accurately position and maintain each of the driving clutch plates and each of the driven clutch plates in their predetermined axially spaced positions, where no drag can occur between the clutch plates.

It will be understood that each of the previously described embodiments could be arranged for hydraulic operation, or even electrical operation, in lieu of the compressed air operation above disclosed.

It will also be understood that the several references to "right hand" end or limits, and to "left hand" end or limits in some of the appended claims is merely a matter of convenience to avoid ambiguities in defining the opposite ends of the clutch assembly.

While we have illustrated and described what we regard to be the preferred embodiments of our invention, nevertheless it will be understood that such are merely exemplary and that numerous modifications and rearrangements may be made therein without departing from the essence of the invention.

We claim:

1. In a friction clutch, the combination of an outer driving annulus, an outer series of friction clutch elements rotating with said annulus and axially shiftable relatively thereto, driving means establishing driving connection with said outer annulus at the left hand end of the clutch assembly, an inner driven shaft extending coaxially of said annulus and outer clutch elements, an inner series of friction clutch elements mounted on said inner shaft and shiftable axially relatively thereto, said outer and inner series of clutch elements being disposed in interspersed relation, an inner driven member operatively connected with the left hand end of said inner driven shaft to be driven thereby, a compressed air power cylinder at the right hand end of the clutch assembly mounted on said outer annulus to rotate continuously therewith, said power cylinder comprising means for effecting clutching engagement between said clutch elements upon energization of said cylinder, outer locator mechanism for automatically restoring said outer clutch elements into their original positions when the clutch is released, said outer locator mechanism comprising outer locator rods having stop shoulders and springs thereon operative to restore the respective outer clutch elements into their normal positions when the clutch is released, inner locator mechanism comprising inner locator rods having stop shoulders and springs thereon operative to restore the respective inner clutch elements into their normal positions when the clutch is released, and means mounted at the left hand end of the clutch assembly for adjusting said inner locator mechanism to adjust the normal clutch-released positions of said inner clutch elements.

2. In a friction clutch, the combination of an outer series of shiftable driving clutch elements, an inner series of shiftable driven clutch elements, said outer and inner series being in interspersed relation, a compressed air power cylinder at the right hand end of the clutch assembly connected with said outer driving clutch elements to rotate continuously therewith, means responsive to said power cylinder for causing the engagement of said clutch upon the energization of said cylinder, outer locator mechanism for automatically restoring said outer driving clutch elements back into their original positions of location when said clutch is released, said outer locator mechanism comprising outer longitudinally extending locator rods, means for causing said outer locator rods to be shifted towards the left hand end of the clutch assembly during the clutch engaging operation concurrently with such shifting of the right hand shiftable driving clutch element, return spring means operative to return each of said outer locator rods back to its original position, outer stop shoulders on each of said outer rods for predetermining the left hand limits of the shifted positions to be occupied by the outer driving clutch elements in the normal clutch-released position of the parts, said outer stop shoulders all shifting simultaneously with said outer locator rods in their shifting movement towards the left, compression springs on said outer rods interposed between said stop shoulders and said outer driving clutch elements for normally resiliently holding said latter clutch elements pressed towards the left against their respective position determining stop shoulders, inner locator mechanism for automatically restoring said inner clutch elements into their original positions when the clutch is released, said inner locator mechanism comprising inner locator rods mounted for axial adjustable shifting movement, inner stop shoulders on each of said inner rods for predetermining the right hand limits of the normal shifted positions of the inner driven clutch elements when the clutch is released, inner compression springs on said inner rods for normally resiliently holding said inner driven clutch elements pressed towards the right against their respective position determining stop shoulders on said inner rods, and means for adjusting the normal longitudinal position of said inner locator rods for adjusting the normal idling positions of said inner driven clutch elements.

3. The combination defined in claim 1 wherein the means for adjusting said inner locator mechanism comprises rotatable members rotatably mounted on said inner locator rods, and means cooperating with said inner clutch elements and with said inner locator rods for preventing rotation of said inner locator rods when said rotatable members are rotated in the performance of an adjusting operation.

4. The combination defined in claim 2 wherein the means for adjusting the normal longitudinal position of said inner locator rods comprises nuts screwing over threads on said inner rods, and polygonal formations on said rods engaging with polygonal openings in said inner clutch elements for preventing rotation of said inner locator rods when said nuts are rotated in the performance of an adjusting operation.

5. In a friction clutch, the combination of an outer series of shiftable friction clutch elements, an inner series of shiftable friction clutch elements, said outer and inner series being concentrically mounted in interspersed relation, means for causing shifting movement of said clutch elements into clutch engaging relation, inner locator mechanism for accurately locating each of said inner clutch elements in their normal idling positions when the clutch is released, said inner locator mechanism comprising a plurality of inner locator rod assemblies extending longitudinally of the clutch in angularly spaced relation, each of said locator rod assemblies comprising a longitudinally extending rod, a plurality of stop shoulders on said rod for predetermining the normal idling positions of said inner clutch elements, and springs on said rod for normally holding said inner clutch elements pressed against said stop shoulders.

6. The combination defined in claim 5 which also includes means for mounting each locator rod assembly which permits the rod assembly to be shifted longitudinally for adjustment purposes.

7. The combination defined in claim 5 which also includes a nut screwing over a threaded portion of said rod for effecting the longitudinal shifting of said rod for adjustment purposes, and a hexagonal formation on said rod slidably engaging in a hexagonal hole in one of said inner clutch elements for preventing rotation of said rod when said nut is rotated thereon.

8. The combination defined in claim 5 which also includes a nut screwing over a threaded portion of said rod for effecting longitudinal shifting of said rod for adjustment purposes, one of said stop shoulders being of hexagonal formation for slidably engaging in a hexagonal hole in one of said inner clutch elements for preventing rotation of said rod, and a circular hole in said latter clutch element adapted to be engaged by said hexagonal formation.

9. In a friction clutch, the combination of an outer series of shiftable friction clutch elements, an inner series of shiftable friction clutch elements, said outer and inner series being concentrically mounted in interspersed relation, means for causing shifting movement of said clutch elements into clutch engaging relation, outer locator assemblies for accurately locating each of said outer clutch elements in their normal idling positions when the clutch is released, inner locator assemblies for accurately locating each of said inner clutch elements in their normal idling positions when the clutch is released, each of said outer and inner locator assemblies comprising a longitudinally extending rod, a plurality of stop shoulders on said rod for predetermining the normal idling positions of their respective clutch elements, and springs on said rod for normally holding their respective clutch elements pressed against their respective stop shoulders, the springs on the rods of said outer locator assemblies normally tending to push said outer clutch elements in one direction, and the springs on the rods of said inner locator assemblies normally tending to push said inner clutch elements in the opposite direction.

10. The combination defined in claim 9, which also includes means shiftably mounting the locator rod of one of said assemblies for permitting the latter assembly to be shifted longitudinally for adjustment purposes.

11. In a friction clutch, the combination of an outer driving annulus having internal longitudinally extending gear teeth therein, an outer series of clutch elements provided with outwardly projecting gear teeth having axially slidable mesh with said internal gear teeth, an inner driven hub having outwardly projecting splines extending longitudinally thereof, an inner series of driven friction clutch elements provided with internal splines having axially slidable mesh with said external splines, said outer and inner series of clutch elements being disposed in interspersed relation, thrusting means for exerting thrusting pressure against said clutch elements comprising a doughnut shaped expansible ring adapted to have fluid pressure introduced therein, and inner locator mechanism for automatically restoring said inner clutch elements into their original positions when the clutch is released.

12. In a friction clutch, the combination of an outer series of shiftable friction clutch elements, an inner series of shiftable friction clutch elements, said outer and inner series being concentrically mounted in interspersed relation, said outer series of clutch elements having outer peripheral portions projecting radially outwardly beyond the outer peripheral edges of said inner series of clutch elements, said inner series of clutch elements having inner peripheral portions projecting inwardly beyond the inner peripheral edges of said outer series of clutch elements, power mechanism for shifting said clutch elements together into clutching engagement, outer locator mechanism for automatically restoring said outer clutch elements into their original positions when the clutch is released, said outer locator mechanism comprising outer shiftable rod means passing longitudinally through the outer peripheral portions of said outer clutch elements beyond the outer peripheries of said inner clutch elements, inner locator mechanism for automatically restoring said inner clutch elements into their original positions when the clutch is released, said inner locator mechanism comprising inner shiftable rod means passing longitudinally through said inner peripheral portions of said inner clutch elements beyond the inner peripheries of said outer clutch elements, said outer locator rod means and said inner locator rod means both being provided with stop shoulders and cooperating springs for restoring their respective clutch elements into their normal positions when the clutch is released.

13. In a friction clutch, the combination of an outer series of shiftable friction clutch elements, an inner series of shiftable friction clutch elements, said outer and inner series being concentrically mounted in interspersed relation, said outer series of clutch elements having outer peripheral portions projecting radially outwardly beyond the outer peripheral edges of said inner series of clutch elements, said inner series of clutch elements having inner peripheral portions projecting inwardly beyond the inner peripheral edges of said outer series of clutch elements, power mechanism for shifting said clutch elements together into clutching engagement, outer locator mechanism for automatically restoring said outer clutch elements into their original positions when the clutch is released, said outer locator mechanism comprising outer shiftable rod means passing longitudinally through the outer peripheral portions of said outer clutch elements beyond the outer peripheries of said inner clutch elements, inner locator mechanism for automatically restoring said inner clutch elements into their original positions when the clutch is released, said inner locator mechanism comprising inner shiftable rod means passing longitudinally through said inner peripheral portions of said inner clutch elements beyond the inner peripheries of said outer clutch elements, a compressed air power cylinder mounted at one end of the clutch assembly to rotate constantly with said outer clutch elements, means responsive to said power cylinder for causing engagement of said clutch upon energization thereof, and adjusting means operative from the opposite end of the clutch assembly for adjusting said inner locator mechanism to adjust the normal clutch-released positions of said inner clutch elements.

References Cited by the Examiner

UNITED STATES PATENTS

| | | | |
|---|---|---|---|
| 1,847,355 | 3/1932 | Musham | 192—88 |
| 2,481,834 | 9/1949 | Foster | 192—69 |
| 2,523,501 | 9/1950 | Davies et al. | 192—69 |
| 2,727,402 | 12/1955 | Thoresen | 74—361 |
| 2,747,711 | 5/1956 | Schmitter et al. | 192—69 X |
| 2,894,407 | 7/1959 | Brill | 74—361 |

DAVID J. WILLIAMOWSKY, *Primary Examiner.*

DON A. WAITE, *Examiner.*

A. T. McKEON, *Assistant Examiner.*